(12) United States Patent
Rasmussen

(10) Patent No.: US 9,541,064 B2
(45) Date of Patent: Jan. 10, 2017

(54) WIND TURBINE HAVING A HTS GENERATOR WITH A PLURALITY OF PHASES

(71) Applicant: ENVISION ENERGY (DENMARK) APS, Silkeborg (DK)

(72) Inventor: Peter Rasmussen, Svendborg (DK)

(73) Assignee: ENVISION ENERGY (DENMARK) APS, Silkeborg (DK)

( * ) Notice: Subject to any disclaimer, the term of this patent is extended or adjusted under 35 U.S.C. 154(b) by 37 days.

(21) Appl. No.: 14/132,365

(22) Filed: Dec. 18, 2013

(65) Prior Publication Data

US 2014/0175796 A1 Jun. 26, 2014

(30) Foreign Application Priority Data

Dec. 21, 2012 (DK) .................................. 2012 70821

(51) Int. Cl.
*F03D 7/04* (2006.01)
*H02K 55/04* (2006.01)
(Continued)

(52) U.S. Cl.
CPC ............... *F03D 7/042* (2013.01); *F03D 7/028* (2013.01); *F03D 9/003* (2013.01); *H02K 7/1838* (2013.01);
(Continued)

(58) Field of Classification Search
CPC .......... F03D 7/028; F03D 7/042; F03D 9/003; H02K 55/04; H02K 7/1838; H02P 25/22; H02M 7/493; Y02E 10/76; Y02E 10/763; Y02E 40/625
See application file for complete search history.

(56) References Cited

U.S. PATENT DOCUMENTS 5,460,244 A * 10/1995 Tanahashi ..................... 187/293
6,803,671 B1   10/2004 Wobben
(Continued)

FOREIGN PATENT DOCUMENTS

CN    201509157    6/2010
CN    201750164    2/2011
(Continued)

OTHER PUBLICATIONS

Search Report prepared by the Danish Patent and Trademark Office on Jun. 14, 2013, for Application No. PA 2012 70821.

*Primary Examiner* — Viet Nguyen
(74) *Attorney, Agent, or Firm* — Sheridan Ross PC

(57) ABSTRACT

The present invention relates to a wind turbine having a wind turbine tower with a nacelle provided on the top to which a rotor hub with one or more wind turbine blades is rotatably mounted by a rotor shaft. A generator is arranged in the nacelle, wherein the superconducting rotor coils induce a current in the stator coils when the rotor is rotated, and wherein the stator coils are arranged in at least four phases. One or more converter modules convert the power output from the generator so that it matches the power of a power grid. The generator side of the converter modules comprises a number of rectifying circuits equal to the phases in the generator, while the power grid side comprises a number of inverting circuits equal to the phases of the power grid. This allows the transient of the electromagnetic brake torque relative to the nominal electromagnetic torque of the generator to be reduced. The ripples of the electromagnetic torque are also reduced since the switching frequency of the converter is increased. This in turn reduces the mechanical stresses occurring in the drive train in the event of a failure or error occurring in one of the converter modules. The present invention also relates to a method of operation of such a wind turbine where the defective converter module is (Continued)

selectively switched off and the wind turbine is put into operation again at a lower operation level.

6 Claims, 5 Drawing Sheets

(51) Int. Cl.
    *H02K 7/18*     (2006.01)
    *F03D 7/02*     (2006.01)
    *F03D 9/00*     (2016.01)
    H02P 25/22     (2006.01)
    H02M 5/458     (2006.01)
    H02M 7/493     (2007.01)

(52) U.S. Cl.
    CPC ............ *H02K 55/04* (2013.01); *H02M 5/4585* (2013.01); *H02M 7/493* (2013.01); *H02P 25/22* (2013.01); *Y02E 10/721* (2013.01); *Y02E 10/722* (2013.01); *Y02E 10/723* (2013.01); *Y02E 10/725* (2013.01); *Y02E 10/76* (2013.01); *Y02E 40/625* (2013.01)

(56) References Cited

U.S. PATENT DOCUMENTS

| | | | |
|---|---|---|---|
| 8,174,138 B2* | 5/2012 | Castelli Dezza et al. | 290/44 |
| 2006/0214428 A1* | 9/2006 | Altemark et al. | 290/44 |
| 2007/0035263 A1* | 2/2007 | Rastogi et al. | 318/432 |
| 2007/0086221 A1* | 4/2007 | Ritter et al. | 363/34 |
| 2008/0031024 A1* | 2/2008 | Pasuri et al. | 363/65 |
| 2008/0116770 A1* | 5/2008 | Lewis | 310/68 D |
| 2009/0224607 A1* | 9/2009 | Kjaer et al. | 307/82 |
| 2009/0295168 A1 | 12/2009 | Meinke et al. | |
| 2009/0322082 A1* | 12/2009 | Wagoner et al. | 290/44 |
| 2010/0060000 A1* | 3/2010 | Scholte-Wassink | 290/44 |
| 2010/0133816 A1* | 6/2010 | Abolhassani et al. | 290/44 |
| 2010/0188055 A1* | 7/2010 | Patterson | 322/90 |
| 2011/0012352 A1* | 1/2011 | Nelson et al. | 290/44 |
| 2011/0057446 A1* | 3/2011 | Mayor Lusarreta et al. | 290/44 |
| 2011/0163546 A1* | 7/2011 | Gupta et al. | 290/44 |
| 2012/0217746 A1* | 8/2012 | Groendahl et al. | 290/44 |
| 2012/0228969 A1* | 9/2012 | Kimiabeigi | 310/59 |
| 2013/0169055 A1* | 7/2013 | Bats et al. | 307/84 |
| 2013/0200827 A1* | 8/2013 | Kezobo et al. | 318/400.21 |
| 2013/0234641 A1* | 9/2013 | Li et al. | 318/503 |
| 2013/0279222 A1* | 10/2013 | Cai et al. | 363/78 |
| 2014/0029322 A1* | 1/2014 | Wagoner et al. | 363/127 |
| 2014/0070539 A1* | 3/2014 | Sala Lluma | 290/44 |
| 2014/0225369 A1* | 8/2014 | Bodewes | 290/44 |

FOREIGN PATENT DOCUMENTS

| | | |
|---|---|---|
| DE | 4032492 A1 | 10/1990 |
| GB | 2416566 A | 2/2006 |
| WO | WO 2012168209 A1 * | 12/2012 |
| WO | WO 2013034610 A2 * | 3/2013 |

* cited by examiner

WIND TURBINE HAVING A HTS GENERATOR WITH A PLURALITY OF PHASES

CROSS-REFERENCE TO RELATED APPLICATIONS

This application claims the benefit of Danish Application No. PA 2012 70821 filed Dec. 21, 2012, the entire content of which is incorporated herein by reference.

FIELD OF THE INVENTION

The present invention relates to a wind turbine comprising:
- a wind turbine tower having a top and a bottom;
- a nacelle arranged on top of the wind turbine tower;
- a rotor hub rotatably mounted to the nacelle;
- one or more wind turbine blades mounted to the rotor hub, wherein the wind turbine blades define a rotor plane;
- a shaft coupled to the rotor hub,
- a generator coupled to the shaft, wherein the generator comprises a rotor rotatably arranged in relation to a stator, wherein the rotor comprises at least one superconducting rotor coil and the stator comprises at least one conductive stator coil, wherein the superconducting rotor coils and the stator coils are arranged to have interacting magnetic fields inducing a current in the stator coil when the rotor is rotated, and
- at least one converter is electrically coupled to the generator, wherein the converter comprises a power grid side electrically connected to a generator side, where the power grid side is configured to be electrically coupled to a power grid having a predetermined grid code and the generator side is configured to be electrically coupled to the generator, wherein the converter is configured to convert the output power from the generator so that it matches the power of the power grid, and wherein the stator coils in the generator are arranged so that they form two or more sets of stator coils for reducing the transient of an electromagnetic brake torque relative to a nominal electromagnetic torque of the generator, wherein each set forms a predetermined number of phases.

The present invention also relates to a method of operation of a wind turbine where the operation of the wind turbine comprises the steps of:
- detecting an error in the wind turbine using one or more measuring units electrically coupled to a controller arranged inside the wind turbine;
- activating switching means electrically coupled to the converter in the wind turbine via the controller so that the converter is disconnected from the power grid;
- activating a pitching mechanism coupled to at least a part of the wind turbine blade so that that the pitchable blade part is pitched out of the wind direction.

BACKGROUND OF THE INVENTION

It is known that wind turbines of today comprise a nacelle coupled to the rotor hub and the wind turbine blades in which a generator and a converter are arranged. The generator transforms the mechanical energy from the rotating rotor shaft into an electrical energy which is then transferred to the converter. The converter is coupled to a power grid and converts the power output from the generator into a power output which matches that of the power grid.

Until recently it has been known to use permanent magnet generators (PMGs) in wind turbines which in the recent years have increasing both in size and power output. This means that the generator in the wind turbines also has to increase in size and weight which make the generators more expensive and more difficult to handle during installation. As the power output of the wind turbines increased to over 6 MW, a conventional generator or PMG would no longer be suited for such large wind turbines due to the required size and weight of such generators. Such large and heavy generator would mean that the wind turbine tower would have to be significantly reinforced and/or the generator would have to be installed in sections due to the limited lifting capacity of the crane used to install the wind turbine.

During the recent years, high temperature superconductors have become commercially available allowing the latest generation of wind turbine generators (high temperature superconductive (HTS) generators) to be used in large wind turbines. A person skilled in the art knowing the problems of the PMG and wanting to improve the generator design for large wind turbines would then be motivated to use to a HTS generator instead.

Such a HTS generator allows the current density for the rotor coils to be considerably increased which in turn means that the power density of the generator also increases. This allows the size and weight of the HTS generator to be reduced while maintaining a high power output and also reducing the costs of such large wind turbines. The reliability of the drive train and the service intervals may be further increased by using a direct drive coupling to the rotor hub instead of a gearbox coupling which is sensitive to wind gusts and mechanical stresses in the drive train.

The HTS generator typically comprises three phases inducing a high magnetic field inside the generator due to the high current density in the rotor coils which in turn forms a high electromagnetic torque in the rotor and hence the rotor shaft. GB2416566A discloses such a wind turbine in which the HTS generator is coupled to the rotor hub. The HTS generator is then coupled directly to a converter via a three-phased coupling. The converter comprises a rectifying unit coupled to the generator and a rectifying circuit coupled to the power grid using three phases, wherein a DC link is arranged between the rectifying unit and the inverting circuit. "Superconducting devices in wind farm" by Xiaohang Li discloses a similar wind turbine with a hybrid drive train comprising a simple gear system coupled to a HTS generator. The HTS generator is coupled to a converter via a three-phased coupling which matches the phases of the power grid.

These configurations have the disadvantage that when a failure in the converter is detected, such as a short circuit occurring in at least one of the IGBTs, the wind turbine has to stop the operation of the drive train and the rotation of the wind turbine blades. The short circuit will cause the generator to initiate a brake torque which is nine to ten times greater than the nominal torque of the generator. This may lead to serious damage of the drive train, in particular the generator, the rotor shaft, the rotor hub, and the wind turbine blades, due to extreme decelerations of the rotating parts.

This problem arises when the person skilled in the art wants to improve the generator design for large wind turbine by using a HTS generator, as the PMG does not suffer from the same problem due to the relative low current density occurring in its rotor coils.

US 2009/0295168 A1 discloses a wind turbine comprising a super conducting generator having a stator assembly and a rotor assembly arranged relative to the stator. The stator assembly comprises a plurality of double helix shaped windings that define the stator coils which are arranged relative to each other in series to form six or twelve phases. This document is silent about how the multiple phases are coupled to the rest of the drive train of the wind turbine.

DE 4032492 A1 discloses an electrical machine comprising a converter unit coupled to a generator having at least two sets of stator windings via switching means. The switching means are used to select between different configurations between the sets of stator windings that make up the stator coils. When the switching means are turned off, each set forms at least three phases that are in-phase with the other two sets. When the switching means are activated, the sets are combined to form a hybrid configuration having six or twelve phases. In this configuration, each set of stator coils is coupled to the same converter unit where switches are used to control the number of phases between the generator and the converter unit.

OBJECT OF THE INVENTION

An object of this invention is to provide a generator configuration which allows the electromagnetic brake torque in the generator to be reduced.

An object of this invention is to provide a generator configuration which allows the short-circuit currents and the influence between the different phases to be reduced.

An object of the invention is to provide a generator configuration which allows the ripple of the electromagnetic torque to be reduced.

DESCRIPTION OF THE INVENTION

An object of the invention is achieved by a wind turbine wherein the converter comprises two or more converter modules each of which comprises a generator side and a power grid side, wherein the generator side of each module comprises a number of rectifying circuits electrically coupled to one of the sets of stator coils arranged in the generator.

This allows the electromagnetic torque initiated in the generator to be reduced when a failure in the converter is detected, e.g., a short circuit of an IGBT. When such a failure is detected, the wind turbine will perform an emergency procedure in which the rotating parts are stopped within a few revolutions. This configuration will significantly reduce the mechanical stresses occurring in the drive train, e.g., the rotor shaft, the rotor hub, and the wind turbine blades, during such procedure which otherwise could lead to a failure in the wind turbine. The electrical coupling between the generator and the converter are configured so that it forms more than three phases, e.g., six, nine, twelve or higher. The generator may be configured so that the individually stator coils may be arranged in a number of interconnections or windings corresponding to the number of phases. The stator coils may be electrically connected to a number of terminals or a switch unit located at or in the generator which allows the number of interconnections or windings and thus phases to be changed. This allows the electromagnetic torque to be distributed over a greater number of phases than in a traditional generator thus reducing the alternating current passing through each phase. This also allows the ripples of the electromagnetic torque to be significant reduced since the switching frequency of the converter is significantly increased. This in turn reduces the stresses in the rotating parts during full load and increases the reliability of the drive train.

This configuration allows the converter to be configured as a full scale converter thus allows the wind turbine to operate at maximum power output and provides a better control of the active and reactive power output. This makes the wind turbine particularly suitable to be coupled to a smart power grid.

The electrically coupling between stator coils in the generator and the rectifying circuits in the converter may be configured to reduce the transient of the brake torque to between 100-800%, preferably between 200-600%, preferably between 200-400%, of the nominal torque of the generator. This allows the electromagnetic torque initiated in the generator at a short circuit of an IGBT to be reduced to acceptable level in which the stresses introduced into the drive train would not cause a failure in the wind turbine.

The stator coils may be arranged in two or more sets, e.g., three, four, five or six, each of which may comprise at least two phases, e.g., three, four, five, six or even nine phases. Each phase in each set defines a winding which may be formed by an individual arrangement of the stator coils. All of the sets may form the same number of phases, e.g., three or six, or different numbers of phases, e.g., three and six. This allows the electrical coupling to a converter to be switched between different sets, if needed, or allows each set to be coupled to a different converter module. The total number of phases in the sets defines the number of phases in the electrical coupling between the generator and the converter. The phases or the windings in each set may be arranged relative to an adjacent set and/or relative to the poles or rotor coils in the rotor so that they form a balanced configuration. The angle between two adjacent sets may be defined by the total number of windings or phases arranged in the stator, e.g., 30°, 40°, 60°, 72°, 90° or 120°. The sets may be configured as redundant sets of windings which allow the safety of the generator to be increased.

This allows the mutual inductance between adjacent phases formed in the stator to be reduced thus reducing the circulating currents between these adjacent phases. This also allows the harmonic distortion generated in the generator to be reduced since the frequency of the pulsating field currents is increased.

The converter may be formed by one or more converter modules which are electrically coupled to the sets of stator coils formed in the generator. Each converter module may comprise a number of rectifying circuits which are arranged at the generator side and are configured to rectify the alternative current transferred from the generator into a DC current. Each rectifying circuit may be electrically connected to one of the phases in the set coupled to that converter module. The power side of the converter modules may be electrically coupled to the power grid via a number of inverting circuits, e.g., three, arranged in the power grid side.

This allows the converter to be configured as a modular converter wherein the power output is distributed over the individual converter modules thus reducing the power output for each converter modules. This enables each converter module to be configured as a low voltage or medium voltage module which allows the size and weight of each module to be reduced. The safety of the converter may be increased by configuring at least two of the modules as redundant modules.

According to one embodiment, the converter is electrically coupled to at least one controller configured to control the operation of the converter, wherein the controller comprises at least one sub-controller electrically coupled to the converter and configured to control at least one of the sides of the converter.

The operation of the converter may be controlled or driven by a controller electrically coupled to the converter based on one or more measured or sensed parameters. The rectifying circuits arranged in the generator side may be coupled to a sub-controller which controls or drives the operation of these based on one or more parameters, e.g., the current or voltage transferred to or from the generator, the incoming wind speed, the angular rotation speed or torque of the rotor shaft, or another relevant parameter. This allows the rectifying circuits to maintain a substantially sinusoidal wave form thus increasing the efficiency of the drive generator.

The converter may comprise a number of inverting circuits arranged at the power grid side which are configured to invert the direct current (DC) voltage transferred from the generator side into an alternating voltage matching the current of the power grid. The inverting circuits may be coupled to another sub-controller which controls or drives the operation of these circuits based on one or more parameters, e.g., the current or voltage transferred to or from the power grid, the power specifications of the power grid defined by the grid code, the power reference, or another relevant parameter. Each inverting circuit may comprise an arrangement of transistors, e.g., IGBTs, or diodes. This allows the (reactive and active) power supplied to the power grid to be controlled while maintaining a high power quality.

According to a specific embodiment, the controller is electrically coupled to switching means which are electrically coupled to each of the converter modules, and wherein the controller control the operation of the switching means.

Each converter module may be electrically coupled to switching means in the form of a switch or a contact where the controller controls the operation of these switches or contacts individually. The switching means may be arranged between the set of windings in the generator and the converter modules and/or between the converter modules and the power grid. This allows the controller to switch off the converter when an error or emergency event in the wind turbine has been detected, e.g., a short circuit in one of the rectifying circuits. The controller may be configured to transmit a control signal to another controller or a sub-controller which then activates the pitching mechanism in the wind turbine blades so that the pitchable part of the blade is pitched or feathered out. The controller may then be configured to switch out the converter module with the detected error and switches in the remaining converter modules. The controller may then be configured to set at least one of the control parameters, e.g., the power reference, to another reduced value, e.g., between 40-60% of the nominal power output, preferably 50%. The other controller or a sub-controller then activates the pitching mechanism in the wind turbine blades so that they or pitched or feathered in based on a control signal received from the controller.

This enables the defective converter module to be removed and replaced by a new converter module without taking the wind turbine out of operation. This reduces the down time and allows for an easy and quick service of the converter in the event of the failure in one of the converter modules.

According to a specific embodiment, one of the sets of stator coils are arranged so that they form a polyphase coupling electrically connected to the rectifying circuits arranged in one of the generator sides of the converter modules.

This allows the electrically coupling between the generator and the converter to be formed as a single polyphase coupling comprising more than three phases, preferably six, nine, twelve or any number of phases in between these values. The stator coils are arranged in a periphery of the stator which faces a periphery of the rotor in which the rotor coils are arranged. The stator and rotor coils are separated from each other by a predetermined air gap so that the field strength of the magnetic field is increased. The stator comprises a plurality of stator coils and/or poles which are connected to each other so that they form a number of windings corresponding to the number of phases in the polyphase coupling. Each rectifying circuit in the converter is configured to rectify the alternative current transferred from the generator into a DC current which then transferred to a DC link. Each individual rectifying circuit is electrically connected to one of the phases in the polyphase coupling. The rectifying circuit may be configured as an arrangement of transistors, e.g., IGBTs, or diodes.

The windings formed in the stator by the interconnected stator coils may be arranged relative to each other, e.g., in a predetermined angle, and/or relative to the poles or rotor coils in the rotor so that they form a balanced configuration. The angle between two adjacent windings may be 30°, 40°, 60°, 72°, 90° or 120°. This allows the mutual inductance between adjacent phases formed in the stator to be reduced, and thus reducing the circulating currents between the adjacent phases. This also allows the harmonic distortion generated in the generator to be reduced since the polyphase coupling allows the frequency of the pulsating field currents to be increased.

According to one embodiment, the stator comprises a plurality of slots in which the stator coils are arranged, and wherein the coils are arranged in at least two layers.

This allows the stator coils to be arranged in multiple layers in the slots so that the phase displacement between the phases or windings formed by the arrangement of stator coils is reduced. The stator coils may be arranged so that each phase or winding of the generator is located in each layer. The order in which the phase or windings are arranged in the first layer may be opposite of the order in the second layer. If the stator coils are arranged in more than two layers, then the order of each layer may differ, e.g., be opposite, from the order of an adjacent layer or the stator coils may be arranged in groups having the same order.

According to one embodiment, a direct current link is electrically connected between the output of the generator side and the input of the power grid side in the converter.

A DC link in the form of one or more capacitors may be arranged between the two sides of the converter. This allows the energy to be stored in the capacitors so that the voltage level transferred to the power grid side may be maintained at a substantially constant level and allows the voltage ripple to be reduced. This allows the wind turbine to be coupled to the power grid using a soft start, since the capacitors may be charged to the desired voltage level before the wind turbine is coupled to the power grid. The measuring unit may be coupled to the DC link and the controller where the measuring unit may be configured to measure the voltage level of the link. The voltage level may be used to control the operation of the generator side and the power grid side of the converter. A protective circuit in the form of a chopper circuit may be coupled to the DC link in order to protect the drive train from a short circuit on the grid.

According to one embodiment, a transformer comprising a primary side and a secondary side is electrically coupled between the converter and the power grid.

The transformer may be configured to ramp up or ramp down the voltage level of the converter so that it matches the voltage of the power grid. The transformer protects the drive train from any power grid failure which could damage the drive train. Filtering means in the form of one or more capacitors and/or inductors may be arranged between the converter and the transformer and/or between the generator and the converter. This allows harmonics in the output current supplied to the power grid and the ripple of the output current to be reduced.

The object of the invention is also achieved by a method of operating a wind turbine wherein
- the controller selectively switches off that part of the converter in which the error is detected and switching in the remaining parts of the converter; and
- activating the pitching mechanism coupled so that that the pitchable blade part is pitched into the wind direction.

This method allows the wind turbine in an emergency situation to be shortly taken out of operation before being put into operation again thus reducing the total downtime of the wind turbine. The controller disconnects (switches off) the converter from the power grid when an emergency event has been detected. The emergency event may be a short circuit in one of the converter modules. The controller then activates the pitching mechanism in the wind turbine blades and the pitchable part of the blade is pitched or feathered out of the wind. The controller may also activate the mechanical brakes and/or use the generator to brake the wind turbine blades by transferring energy back into the generator. The pitching mechanism is then activated again via the controller and the pitchable part of the blade is pitched or feathered into the wind. If the controller uses a soft start up, then converter is first switched in again when the DC link is charged to a predetermined level.

According to a specific embodiment, the controller changes at least one of the control parameters which are used to control the operation of the wind turbine to another predetermined value which is lower than its value during normal operation.

When an emergency situation is detected, the wind turbine may be operated at a lower operation level so that the mechanical stresses and strain in the wind turbine, e.g., in the drive train, are reduced. This may be done by switching out the converter module in which the detected error has been detected using the controller after which the remaining converter modules are connected to the power grid again (switched in). The controller may then set at least one of the control parameters using to control the operation of the wind turbine to another lower value.

According to a specific embodiment, the control parameter is the power reference and the predetermined value is between 40 to 60% of the nominal power output.

The control parameter may be a power reference, maximum allowable wind speed, power efficiency or another suitable control parameter. In a preferred embodiment, the power reference is set to a reduced value, e.g., between 40-60% of the nominal power output, preferably 50%.

DESCRIPTION OF THE DRAWING

The invention is described by example only and with reference to the drawings, wherein.

In the following text, the figures will be described one by one and the different parts and positions seen in the figures will be numbered with the same numbers in the different figures. Not all parts and positions indicated in a specific figure will necessarily be discussed together with that figure.

DETAILED DESCRIPTION OF THE INVENTION

Figure 1:
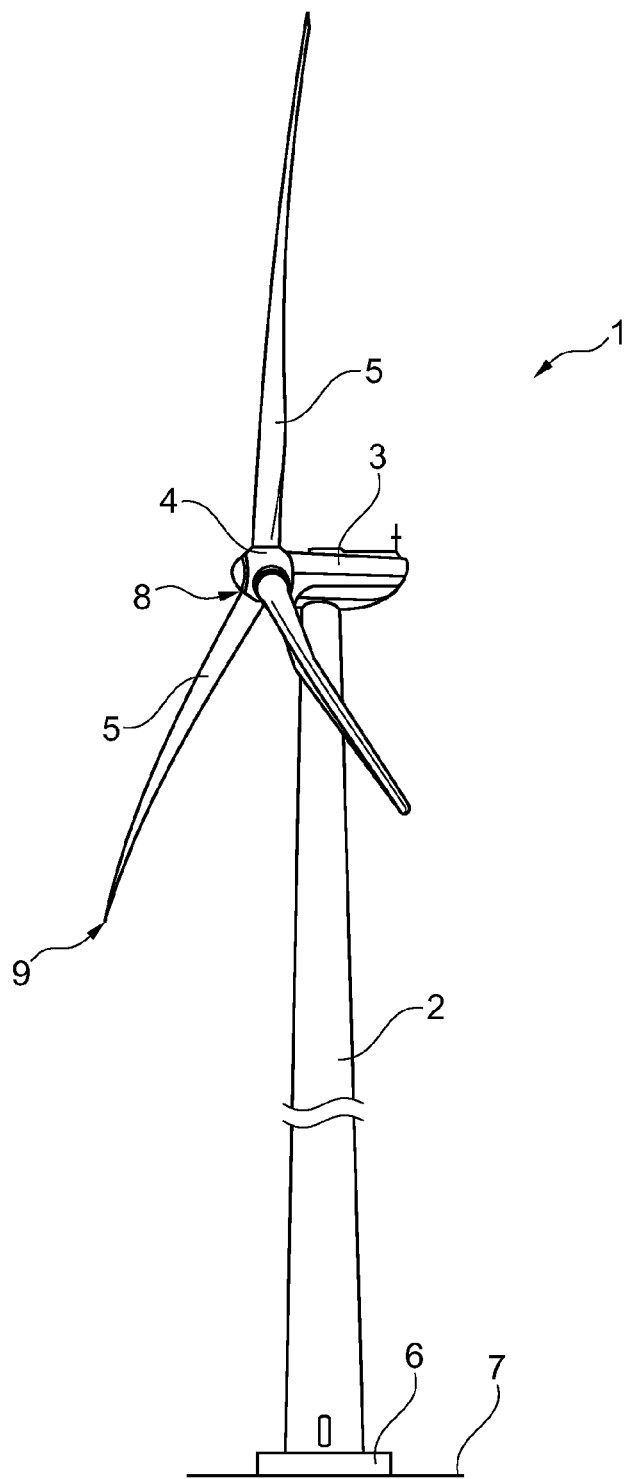
FIG. 1 shows an exemplary embodiment of a wind turbine.

FIG. 1 shows an exemplary embodiment of a wind turbine 1 comprising a wind turbine tower 2 and a nacelle 3 mounted at the top of the wind turbine tower 2. The wind turbine tower 2 may comprise one or more tower sections mounted on top of each other. A rotor hub 4 may be rotatably mounted to the nacelle 3 via a rotor shaft. One or more wind turbine blades 5 may be mounted to the rotor hub 4 via a shaft extending outwards from the center of the rotor hub. Two or three wind turbine blades 5 may be mounted to the rotor hub 4 where the wind turbine blades 5 form a rotor plane. The wind turbine tower 2 may be mounted onto a foundation 6 extending above a ground level 7.

The wind turbine blade 5 may comprise a blade root 8 configured to be mounted to the rotor hub 4. The wind turbine blade 5 may comprise a tip end 9 arranged at the free end of the blade 5. The wind turbine blade 5 has an aerodynamic profile along the length of the blade. The wind turbine blade 5 may be made of fiber reinforced plastics or composites, e.g., having fibers made of glass, carbon, or organic fibers, which form a laminate. The laminate may be infused using a resin, e.g., epoxy, supplied by an external system, e.g., a vacuum infusion system.

Figure 2:
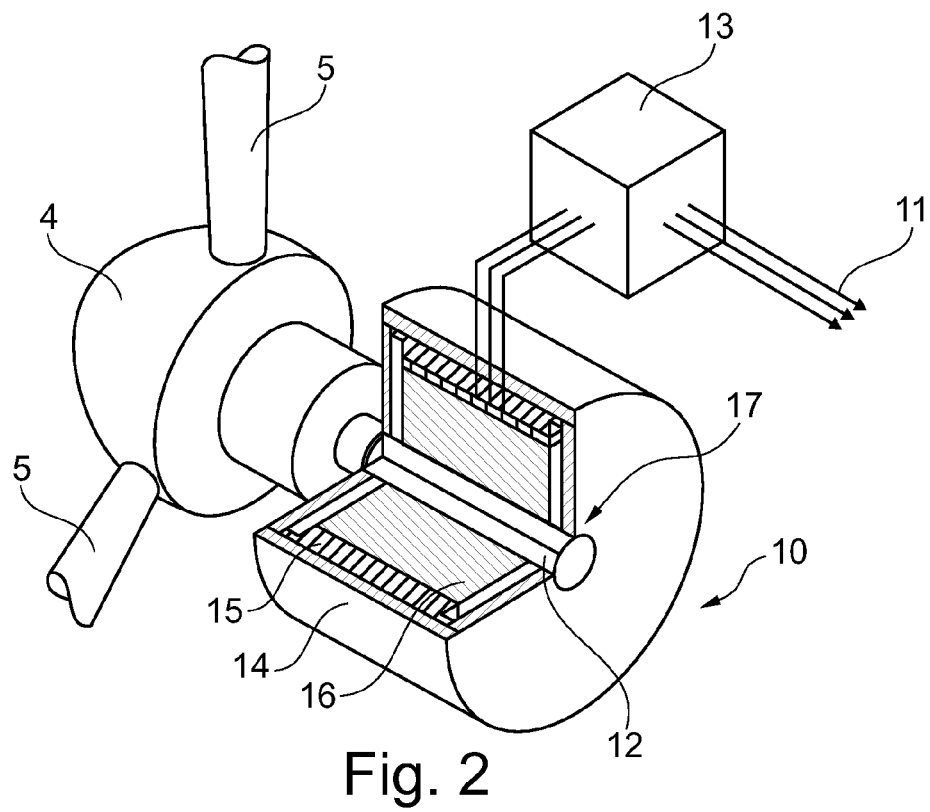
FIG. 2 shows an exemplary embodiment of a generator coupled to a power grid and the rotor hub.

FIG. 2 shows an exemplary embodiment of a generator 10 in the form of a high temperature superconducting (HTS) generator coupled to a power grid 11 and the rotor hub 4. The rotor hub 4 may be coupled to the generator 10 arranged inside the nacelle 3 via the rotatable rotor shaft 12. The rotor shaft 12 defines a rotation axis around which the rotor hub 4 and the wind turbine blades 5 rotate. The wind turbine blades 5 are configured to transform the kinetic energy of the incoming wind hitting the rotor plane into a mechanical energy which is transferred to the generator 10 via the rotor shaft 12. The generator 10 is configured to transform the mechanical energy into an electrical energy which then transferred to a converter 13.

The generator 10 may comprise a generator housing 14 encapsulating a stator 15 and a rotor 16. The generator housing 14 may be shaped as a cylindrical housing which is closed at the ends by two end plates, as shown in FIG. 2. The rotor shaft 12 may extend into the generator 10 and optionally through the generator 10, as shown in FIG. 2. One or more support means 17 may be arranged at and/or inside the generator housing 14 wherein the support means 17 may be configured to receive and support the rotor shaft 12 during rotation. The rotor shaft 12 may be supported by support means 17 in the form of bearings, e.g., located at the end plates, and/or supported directly by the generator housing 14. The stator 15 may comprise a number of stator coils (not shown) made of a conductive material, e.g., copper, while the rotor 16 may comprise a number of rotor coils (not shown). The stator 15 and the rotor 16 may be arranged relative to each other so that the rotor coils induce a magnetic field which interacts with the stator coils.

The rotor 16 may be configured as a superconductive rotor comprising at least a number of rotor coils made of a HTS material, e.g., Bi—Sr—Ca—Cu—O (BSCCO), Y—Ba—Cu—O (YBCO), Tl—Ba—Ca—Cu—O, Hg—Ba—Ca—Cu—O, RE—Ba—Cu—O ((RE)BCO), or another suitable material. The term "superconductive" is defined as the state where the resistivity of the selected material for the conductor is zero. The rotor 16 may comprise or may be coupled to a cooling system (not shown) configured to cool the rotor coils so that they reach their superconductive state.

The stator coils in the stator 15 may be arranged so that they form a predetermined number of windings each defining a phase electrically coupled to a predetermined number of rectifying circuits arranged in the converter 13. The converter 13 may be configured to convert the power from the stator 15 so that it matches the specifications (frequency, phase, voltage and current) defined in the grid code for that particular power grid 11.

Figure 3:
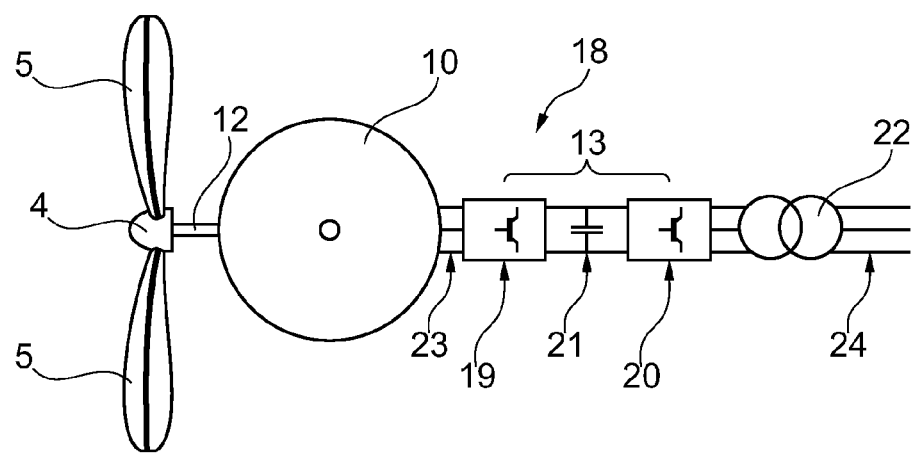
FIG. 3 shows a first exemplary embodiment of a drive train arranged in the wind turbine.

FIG. 3 shows a first exemplary embodiment of a drive train 18 arranged in the wind turbine 1. The drive train 18 may comprise a rotor in the form of the wind turbine blades 5 and the rotor hub 4 mechanically coupled to the generator 10 via the rotor shaft 12. The generator 10 is then electrically coupled to a generator side 19 of the converter 13 which is then electrically coupled to a power grid side 20 via a link 21. The power grid side 20 is then electrically coupled to a transformer 22 which is then electrically coupled to the power grid 11.

The individually stator coils in the stator 15 may be arranged in a number of interconnections so that they form a number of windings. Each winding defines a phase of the generator 10. The stator coils may be configured so that they form a polyphase arrangement comprising six phases 23 (only three of these are shown) defined by six windings. The electrically coupling between the generator 10 and the converter 13 may be configured as a polyphase coupling which is coupled to the phases 23 of the generator 10 and the rectifying circuits arranged in the generator side 19 of the converter 13. The windings formed in the stator 15 by the interconnected stator coils may be arranged relative to each other so that they form a balanced configuration. The angle between two adjacent windings may be 0°, 30° or 60° depending on the desired configuration.

The generator side 19 of the converter 13 may be configured as a polyphase arrangement comprising a number of rectifying circuits which corresponds to the number of windings in the generator 10. The converter 13 may be configured as a full scale converter. The generator side 19 may comprise six rectifying circuits where each of these is electrically coupled to one of the phases 23. Each rectifying circuit in the converter 13 may be configured to rectify an alternative current transferred from the generator 10 into a direct current. The rectifying circuits may be configured as an arrangement of transistors, e.g., IGBTs, comprising a first part connected to a second part. The first part may be configured to rectify the positive half of the alternating current while the second part may be configured to rectify the negative half the alternative current. The respective phase 23 may be coupled to the interconnection between the two parts of the rectifying circuit.

The output of the first parts and the second parts are then electrically coupled to the link 21 so that the rectified current is transferred to the link 21. The link 21 in the form of a direct current link may be configured as an energy storage in the form of one or more banking capacitors. The link 21 may be configured to maintain the voltage level for the power grid side 20 at substantially constant level and to reduce the voltage ripples of the electromagnetic torque in the generator.

The smoothened direct current is then transferred to the power grid side 20 comprising a number of the inverting circuits. The inverting circuits may be configured to invert the direct current from the link 21 to an alternating current for the power grid 11. The power grid side 20 may be configured to invert the direct current into a voltage and a current matching the specifications of the power grid 11. The power grid side 20 may comprise three inverting circuits corresponding to the number of phases 24 of the power grid 11. The inverting circuits may be configured as an arrangement of transistors, e.g., IGBTs, comprising a third part connected to a fourth part. The third part may be configured to generate the positive half of the alternating current while the fourth part may be configured to generate the negative half of the alternative current. The respective phase 24 may be coupled to the interconnection between the two parts of the inverting circuit.

The converter 13 and/or the generator 10 may be electrically coupled to a controller (not shown). The controller may be configured to detect and control the output voltage and/or current transferred to the power grid 11 via one or more sensors electrically coupled to the output of the converter 13. The controller may be configured to detect and control the output voltage and/or current transferred from the generator 10 via one or more sensors electrically coupled to the output of the generator 10. The controller may be configured to measure the voltage level of the link 21 using a measuring unit electrically coupled to the link 21. The voltage level may be used to control the operation of the generator side 19 and the power grid side 20 of the converter 13.

Figure 4:
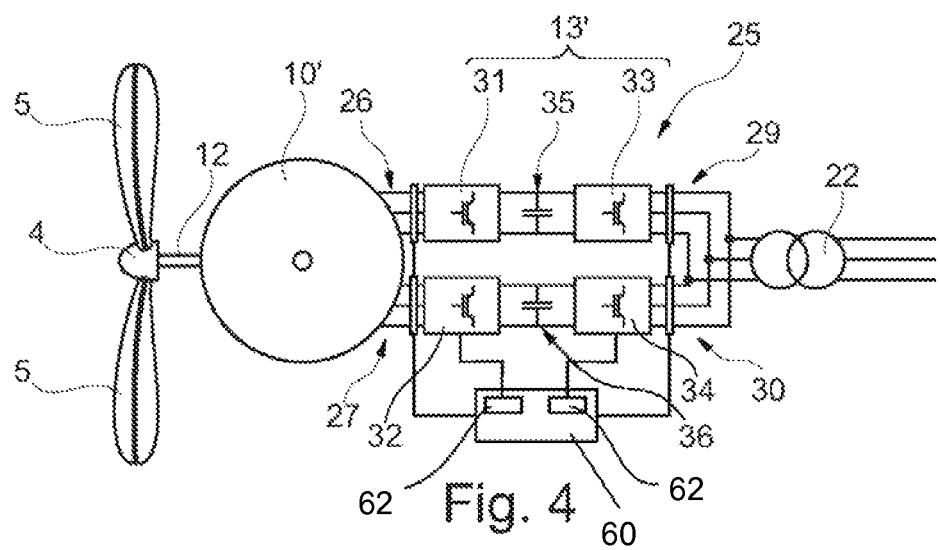
FIG. 4 shows a second exemplary embodiment of a drive train arranged in the wind turbine.

FIG. 4 shows a second exemplary embodiment of a drive train 25 arranged in the wind turbine 1. The drive train 25 differs from the drive train 18 in FIG. 3 by the configuration of the generator 10' and the converter 13'.

The stator coils of the stator 15 may be arranged so that they form at least two sets 26, 27 of stator coils where each set 26, 27 comprises a predetermined number of windings. The stator coils in each set 26, 27 may be arranged so that they form three individual windings. The total number of windings in the sets 26, 27 defines the number of phases between the generator 10' and the converter 13', which in this embodiment is six. Each winding defines a phase of that particular set 26, 27. The individually windings formed in the stator 15 by the stator coils may be arranged relative to each other so that they form a balanced configuration. The angle between two adjacent windings may be 0°, 30° or 60° depending on the desired configuration. The sets 26, 27 may be configured so that they form resultant sets of phases which increases the safety and reliability of the wind turbine 1.

The phases in each set 26, 27 may be electrically coupled to the converter 13' via two electrical coupling having the same number of phases as the sets 26, 27. The converter 13' may be configured as a modular converter comprising at least two converter modules 29, 30. The converter modules 29, 30 may be electrically coupled to the phases in the sets 26, 27 respectively. Each converter module 29, 30 may comprise a generator side 31, 32 electrically coupled to a power grid side 33, 34 via a link 35, 36. The generator side 31, 32 may comprise the same number of rectifying circuits as the phases in each set 26, 27, e.g., three. Each rectifying circuit in the converter modules 31, 32 may be configured to rectify an alternative current transferred from the generator 10' into a direct current. The rectifying circuits may be configured as an arrangement of transistors, e.g., IGBTs, comprising a first part connected to a second part. The first part may be configured to rectify the positive half of the alternating current while the second part may be configured to rectify the negative half of the alternative current. The respective phase of the set 26, 27 may be coupled to the interconnection between the two parts of the rectifying circuit. The power grid side 33, 34 and the link 35, 36 may have the same configuration as the power grid side 20 and the link 21. FIG. 4 also shows an exemplary controller 60 coupled to the modular converter in which the controller 60 has at least one sub-controller electrically coupled to the modular converter and configured to control at least one side of the converter modules. FIG. 4 further depicts switching means 62 which are electrically coupled to each of the converter modules, and wherein the controller 60 is configured to control the operation of the switching means 62.

Figure 5:
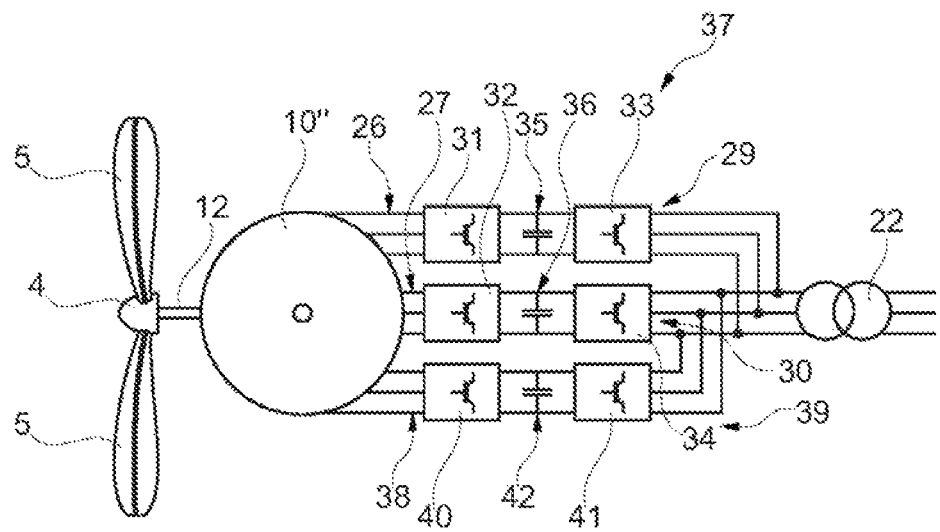
FIG. 5 shows a third exemplary embodiment of a drive train arranged in the wind turbine.

FIG. 5 shows a third exemplary embodiment of a drive train 37 arranged in the wind turbine 1. The drive train 37 differs from the drive train 25 in FIG. 4 in that the generator 10" comprises three sets 26, 27, 38 of phases and the converter 13" comprises three converter modules 31, 32, 39.

The set 38 of windings formed by the stator coils may have the same configuration as the other sets 26, 27 and comprise the same number of phases. The converter module 39 may have same configuration as the other converter modules 29, 30. The link 42 may have the same configuration as the other links 35, 36. In an alternative embodiment, the third set 38 may comprise a higher number of windings or phases, e.g., six, than the other sets 26, 27. The generator side 40 of the third converter module may be configured so that it has the same number of rectifying circuits, e.g., six, as the phases in the third set 38. The power grid side 41 may have the same configuration as the other power grid sides 33, 34. The third link 42 may have a different configuration that the other links 35, 36. This allows the number of drive paths and the number of phases to be adapted to the desired design of the drive train.

Figure 6:
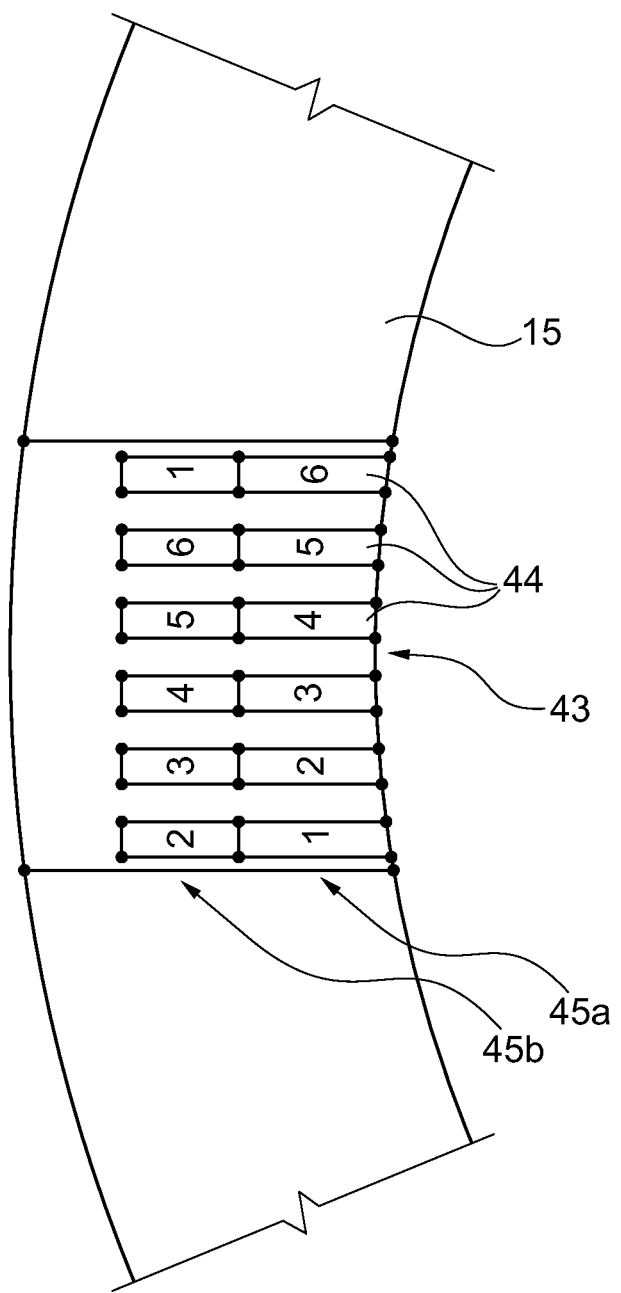
FIG. 6 shows an exemplary embodiment of a winding arrangement in the stator.

FIG. 6 shows an exemplary embodiment of a winding arrangement in the stator 15 where the winding arrangement is placed in a slot 43 in the stator 15. The stator 15 may comprise a plurality of slots 43 in which the stator coils 44 are arranged. The stator coils 44 are positioned in the slots 43 so that they form a plurality of windings each of which defines a phase in the generator 10, 10', 10". The stator coils 44 may be arranged in at least two layers; a first layer 45a and a second layer 45b. The number of windings positioned in the layers 45a, 45b may correspond to the number of phases arranged in the generator 10, 10', 10" or in one of the sets 26, 27, 38. The order in which the windings or stator coils 44 are arranged in each layer 45a, 45b may be opposite of the order in the adjacent layer, as shown in FIG. 6. This allows the width of the windings or phases in the stator 15 to be shortened by dividing the windings into two or more layers 45a, 45b. FIG. 6 shows six phases marked from one to six divided into two sections or sub-windings where the sub-windings marked, e.g., one, define one of the windings or phases of the generator 10, 10', 10".

The windings or phases of the generator 10, 10', 10" may be arranged in a single layer 45a. The six phases shown in FIG. 6 may instead be arranged in a single layer 45a. This allows the windings or phases to be arranged in the stator 15 without dividing them into two or more sections or sub-windings.

Figure 7:
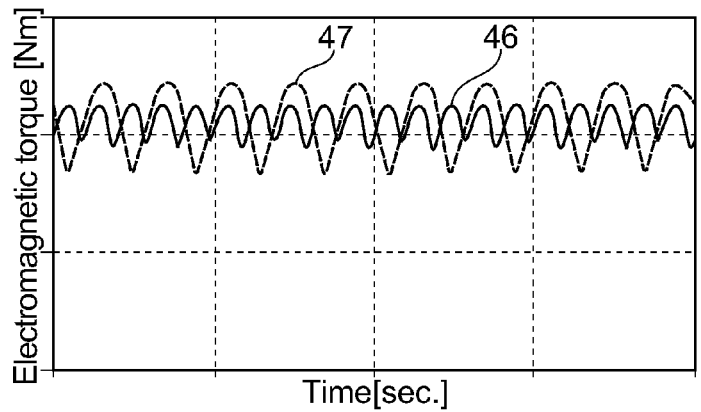
FIG. 7 shows a plot of the electromagnetic torque generated in the generator.

FIG. 7 shows a plot of the electromagnetic torque generated in the generator 10. The plots shown the electromagnetic torque 46 generated by the generator 10, 10' which comprises six phases. The plot also shows the electromagnetic torque 47 generated by a traditional generator comprising three phases.

As shown, the traditional generator generates an electromagnetic torque 47 having large ripples defined by the peak-to-peak value which causes large harmonic distortions to be formed in the generator. The switching frequency of the electromagnetic torque 47 formed by the three phases in the traditional generator is relative low, as indicated in the plot. The generator 10, 10', 10" according to the invention generates an electromagnetic torque 46 where the peak-to-peak value of the ripples is reduced, as shown, since the electromagnetic torque is distribution over a larger number of phases. The peak-to-peak value of the ripples and the harmonic distortion may be reduced with up to 40% or higher depending on the configuration of the generator 10, 10', 10". The generator 10, 10", 10" also increases the switching frequency of the electromagnetic torque 46, as shown in the plot, due to the increased number of phases.

The electrically coupling between the generator 10, 10', 10" and the converter 13, 13' may be configured to reduce the transient of a brake torque to between 100-800% of a nominal torque of the generator depending on the desired configuration and the number of phases of the electrical coupling. The field current generated in each of the phases and thus rectifying circuits is reduced so that the brake torque initiated in the generator due to an error in the converter 13, 13' is reduced to a more acceptable level.

Figure 8:
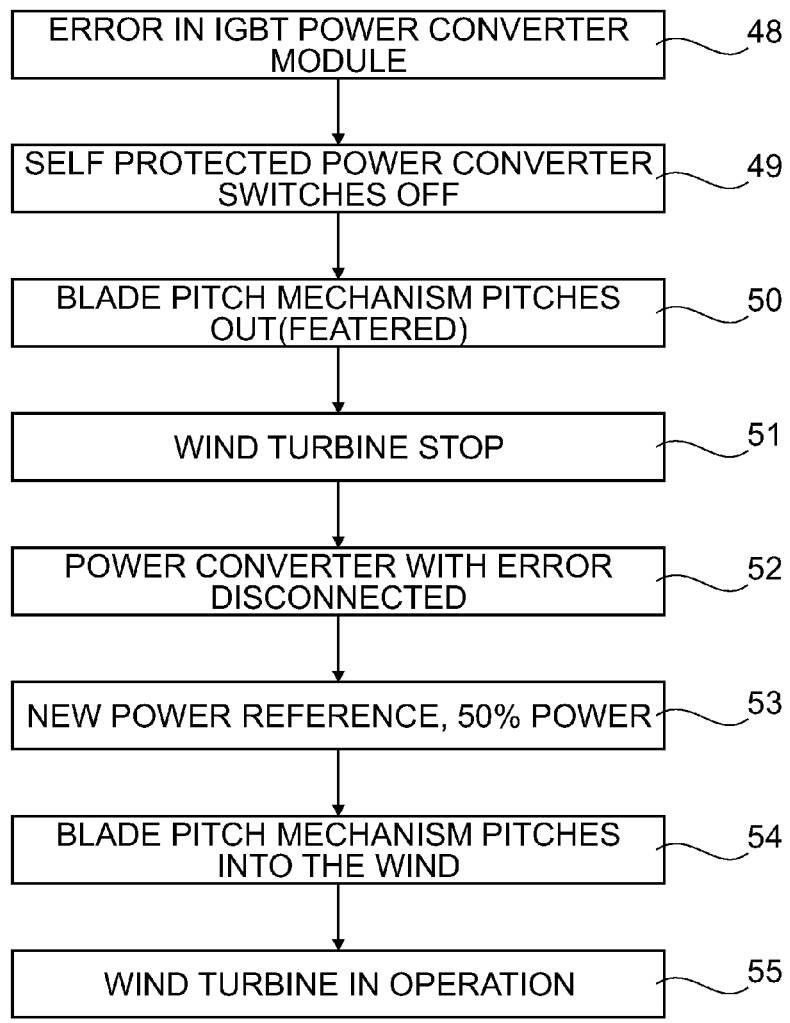
FIG. 8 shows a flowchart of an exemplary method for controlling the operation of a wind turbine when a failure in the converter has been detected.

FIG. 8 shows a flowchart of an exemplary method for controlling the operation of a wind turbine 1 when a failure in the converter 13' has been detected. The controller electrically coupled to the converter modules 31, 32, 39 may be electrically coupled to switching means (not shown) which are coupled to each of the converter modules 31, 32, 39. The switching means may be configured to switch the converter modules 31, 32, 39 in or out depending on a control signal transmitted from the controller. The switching means may be arranged between the sets 26, 27, 38 of windings in the generator 10', 10" and the converter modules 31, 32, 39 and/or between the converter modules 31, 32, 39 and the power grid 11. The controller may be electrically coupled to another controller configured to control the pitching of pitchable parts of the wind turbine blades 5. One or more measuring units may be used to monitor the performable of the generator 10', 10" and/or the converter modules 31, 32, 39.

When the controller in the wind turbine 1 detects 48 an error or failure in one or more of the converter modules 31, 32, 39, then the controller transmits a control signal to the switching means. The switching means is then activated 49 so that the converter 13' is disconnected from the power grid 11. Another control signal is then transmitted to the other controller coupled to the pitching system of the wind turbine blade 5. The pitching system then activates 50 the pitching mechanism of the wind turbine blade 5 so that the pitchable part is pitched out of the wind direction. The wind turbine 1 may then be stopped 51, e.g., by using one or more brakes coupled to the rotor of the drive train 25, 37. The controller may transmit power back into the generator, e.g., from another power source or the power grid 11, so that generator 10', 10" may be used to brake the rotor.

The controller may then selectively switch off 52 that converter module 31, 32, 39 in which the error or failure is detected. The other converter modules 31, 32, 39 may then be switched in so that the converter 13' is electrically coupled to the power grid 11 again. The controller may be configured to start the operation of the wind turbine 1 using a soft startup in which the converter 13' is first switched in when the links 35, 36, 42 are charged to a predetermined level.

The controller may then change 53 the value of one or more of the control parameters used to control the operation of the wind turbine 1 in a normal operation mode. The control parameters may be the power reference. The power reference may be set to a nominal value between 90-100% in the normal operation mode. The controller may in the event of an emergency, e.g., a failure or error in one of the converter modules 31, 32, 39, then set the control parameter to another value which may be lower than the value in the normal operation mode. The power reference may be set to a value between 40-60% in the event of a failure or error in one of the converter modules 31, 32, 39.

The controller may then transmit a control signal to the other controller coupled to the pitching system of the wind turbine blade 5. The pitching system then activates 54 the pitching mechanism of the wind turbine blade 5 so that the pitchable part is pitched into the wind direction again. The controller may also release the brakes holding the rotor. The wind turbine is then put into operation 55 again but at a lower operating level so that the mechanical stresses and strain in the wind turbine, e.g., in the drive train, are reduced.

What is claimed is:

1. A method of operating a wind turbine comprising:
providing:
a wind turbine tower having a top and a bottom,
a nacelle arranged on top of the wind turbine tower,
a rotor hub rotatably mounted to the nacelle,
one or more wind turbine blades mounted to the rotor hub, wherein the wind turbine blades define a rotor plane, and wherein a pitching mechanism is coupled to at least a part of one of the wind turbine blades,
a shaft coupled to the rotor hub,
a generator coupled to the shaft, the generator having a rotor rotatably arranged in relation to a stator, the rotor comprising at least one superconducting rotor coil and the stator comprises at least one conductive stator coil, wherein the superconducting rotor coils and the stator coils have interacting magnetic fields inducing a current in the stator coil when the rotor is rotated,
at least one converter is electrically coupled to the generator, the at least one converter having a power grid side electrically connected to a generator side, the power grid side electrically coupled to a power grid having a predetermined grid code, and the generator side electrically coupled to the generator, wherein the at least one converter is configured to convert the power output from the generator so that it matches the power of the power grid,
wherein the stator coils in the generator form at least two sets of stator coils for reducing a transient of an electromagnetic brake torque relative to a nominal electromagnetic torque of the generator, and wherein each set of stator coils forms a predetermined number of phases, and wherein the at least one converter includes at least two converter modules each having a generator side and a power grid side, wherein the generator side of each converter module comprises a plurality of rectifying circuits electrically coupled to one of the sets of stator coils arranged in the generator,
wherein at least one controller is electrically coupled to at least one measuring unit and to switching means which are electrically coupled to each of the at least two converter modules, wherein the at least one controller is configured to control the operation of the switching means so that the power output is distributed over said at least two converter modules in a normal operation mode;
detecting an error in the wind turbine via the at least one measuring unit;
activating the switching means via the at least one controller so that the at least one converter is disconnected from the power grid;
activating the pitching mechanism so that said at least a part of one of the wind turbine blades is pitched out of a wind direction;
wherein the at least one controller selectively switches off a part of the at least one converter in which the error is detected;
further activating the pitching mechanism so that said at least a part of one of the wind turbine blades is pitched into the wind direction,
wherein the at least one controller switches in any remaining parts of the at least one converter in which no error is detected so that the at least one converter is reconnected to the power grid; and
wherein the at least one controller further changes at least a power reference used to control the operation of the wind turbine in the normal operation mode to another predetermined value which is between 40% to 60% of the power output during the normal operation mode.

2. The method of operating a wind turbine according to claim 1, wherein the at least one converter is electrically coupled to the at least one controller which further controls the operation of the at least one converter, the at least one controller having at least one sub-controller electrically coupled to the at least one converter where said at least one sub-controller controls at least one of the generator side and the power grid side of the at least one converter.

3. The method of operating a wind turbine according to claim 1, wherein one of the sets of stator coils is arranged to form forms a polyphase coupling electrically connected to the rectifying circuits arranged in one of the generator sides of the converter modules.

4. The method of operating a wind turbine according to claim 1, wherein the stator comprises a plurality of slots in which the stator coils are arranged, and wherein the stator coils are arranged in at least two layers.

5. The method of operating a wind turbine according to claim 1, wherein a direct current link is electrically connected between an output of the generator side and an input of the power grid side in the at least one converter.

6. The method of operating a wind turbine according to claim 1, wherein a transformer having a primary side and a secondary side is electrically coupled between the at least one converter and the power grid.

* * * * *